United States Patent [19]
Kawabe

[11] Patent Number: 5,289,990
[45] Date of Patent: Mar. 1, 1994

[54] SPINNING REEL

[75] Inventor: Yuzo Kawabe, Izumi, Japan

[73] Assignee: Shimano, Inc., Osaka, Japan

[21] Appl. No.: 728,524

[22] Filed: Jul. 11, 1991

[30] Foreign Application Priority Data

Jul. 26, 1990 [JP] Japan ............... 2-80108[U]

[51] Int. Cl.⁵ .................................... A01K 89/01
[52] U.S. Cl. ........................... 242/233; 242/321
[58] Field of Search ............ 242/230, 231, 232, 233, 242/284, 321; 384/519, 447, 225

[56] References Cited

U.S. PATENT DOCUMENTS

| | | | |
|---|---|---|---|
| 4,098,472 | 7/1978 | Sazaki | 242/231 |
| 4,162,048 | 7/1979 | Sazaki | 242/231 |
| 4,238,085 | 12/1980 | Jannsson | 242/232 |
| 4,513,926 | 4/1985 | Tsunoda | 242/231 |
| 4,569,423 | 2/1986 | Hirano | 384/255 X |
| 4,732,343 | 3/1988 | Maruyama | 242/282 |
| 5,160,099 | 11/1992 | Furomoto | 384/447 |

FOREIGN PATENT DOCUMENTS 62-80570  5/1987  Japan .
1226692  1/1969  United Kingdom .

Primary Examiner—Daniel P. Stodola
Assistant Examiner—Eileen Dunn
Attorney, Agent, or Firm—Dickstein, Shapiro & Morin

[57] ABSTRACT

A spinning reel has a reel body, a rotor rotatably supported to the reel body, a bail arm extending between a pair of arm portions of the rotor and pivotably switchable between an open position and a line-takeup position, a toggle mechanism disposed inside the arm portions for retaining the bail arm either to the open position or to the line-takeup position and a return mechanism for returning the bail arm from the open position to the line-takeup position when the rotor is rotated in a line-takeup direction. The invention further provides the reel with a returning force adjustment mechanism for variably setting at a desired value a reaction force needed for returning the bail arm from the open position to the line-takeup position.

7 Claims, 4 Drawing Sheets

SPINNING REEL

BACKGROUND OF THE INVENTION

1. Field of the Invention

The present invention relates to a spinning reel, and more particularly to a spinning reel including a reel body, a rotor rotatably supported to the reel body, a bail arm extending between a pair of arm portions of the rotor and pivotably switchable between an open position and a line-takeup position, a toggle mechanism disposed inside the arm portions for retaining the bail arm either at the open position or the line-takeup position, and a return mechanism for returning the bail arm placed at the open position to the line-takeup position.

2. Description of the Related Art

A conventional spinning reel of the above-described type is known from e.g. a Japanese laid-open utility model gazette No. 62-80570. In this convention, the toggle mechanism includes a projecting member urged in a projecting direction by means of a compression spring, relative to a pivot member pivotable about an axis extending in parallel with a pivot axis of the bail arm. Further, the return mechanism includes a contact member which comes into contact with the pivot member during rotation of the rotor in the line-takeup direction and pivots the bail arm toward its line-takeup position.

Assume now that the spinning reel such as the above-described convention having the means for automatically switching the bail arm to its line-takeup position in association with rotor rotation is used for a bait casting. That is, in casting a fishing gear, if for instance the handle now has its longitudinal axis aligned normal to the direction in which a fishing rod is swung, a pivotal force may act on the handle which force will urge the handle towards its line-takeup direction. Then, if this pivotal force is strong, this pivotal force from the handle may pivot the rotor to the line-takeup direction thus erroneously switching the bail arm to its line-takeup position. In this respect, the convention has room for improvement.

Incidentally, if the bail arm is switched over to the line-takeup position in the course of casting of the fishing gear, it becomes impossible to feed the fishing line from the spool, whereby the fishing line may be broken.

In view of the above problem, it is conceivable to use e.g. a strong spring in the toggle mechanism so as to prevent the bail arm from being switched over to its line-takeup position by the pivotal force from the handle. However, the bail arm is frequently used during fishing activity; and therefore, such a large operation load will make the operations uncomfortable. In addition, this will also increase operational resistance when an angler switches the bail arm to its line-takeup position by rotating the handle, the operation will become troublesome for an angler to do other type of fishing than the bait casting. Thus, in this respect too, the convention has room for improvement.

The primary object of the present invention is to provide an improved spinning reel which is effective in preventing erroneous switching of the bail arm during a rod swinging action and which also allows easy and comfortable handle operation regardless of the type of fishing.

SUMMARY OF THE INVENTION

For accomplishing the above-noted object, a spinning reel, according to the present invention, comprises:

a reel body;

a rotor rotatably supported to the reel body;

a bail arm extending between a pair of arm portions of the rotor and pivotably switchable between an open position and a line-takeup position;

a toggle mechanism disposed inside the arm portions for retaining the bail arm either to the open position or to the line-takeup position;

a return mechanism for returning the bail arm from the open position to the line-takeup position when the rotor is rotated in a line-takeup direction; and a returning force adjustment mechanism for variably setting at a desired value a reaction force needed for returning the bail arm from the open position to the line-takeup position.

Functions and effects of this construction will be described next.

This construction can be embodied as shown in FIGS. 1 through 3, for instance. With this construction, when a screw member 19 of the returning force adjustment mechanism C is manually rotated, there occurs a shift in a position of a support shaft 12 of the pivot member 13 of the toggle mechanism T, thereby varying the reaction force needed for the toggle mechanism T to move beyond a dead point DP.

That is to say, an angler can effect adjustment of the reaction force used in switching the bail arm 3, depending on the necessity.

Incidentally, the return mechanism C can be also constructed as shown in FIGS. 8 through 11. In either construction, the angler can set the reaction force to a desired value.

Accordingly, in a bait casting operation, the reaction force is set to such a value which will restrict the switching of the bail arm to its line-takeup position. Then, the angler can do the fishing without breaking the fishing line. Further, by setting the reaction force in accordance with the angler's particular necessity, the angler can enjoy comfortable handle operation.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a spinning reel relating to the present invention; in which.

DESCRIPTION OF THE PREFERRED EMBODIMENTS

Preferred embodiments of the present invention will now be described in detail with reference to the accompanying drawings.

Figure 5:
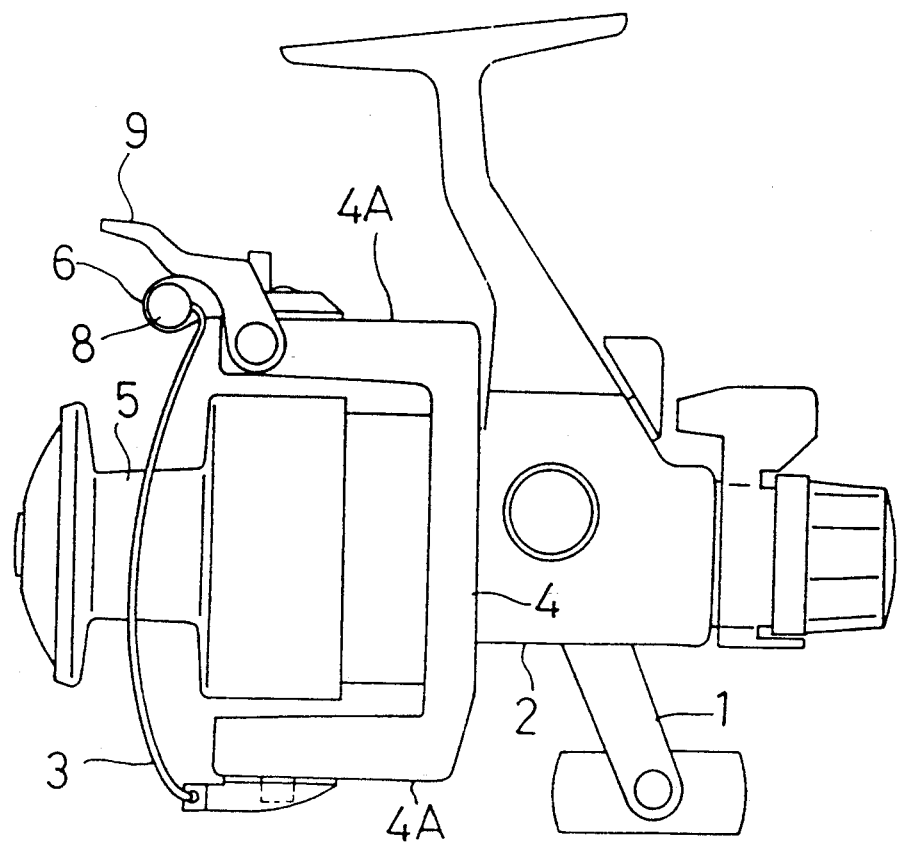
FIG. 5 is an overall side view of a spinning reel.

As shown in FIG. 5, a spinning reel includes a reel body 2 having a handle 1, a rotor 4 having a bail arm 3 and a spool both disposed at forward positions of the reel body 2.

As shown in FIGS. 1 through 4, the rotor 4 integrally forms a pair of arm portions 4A, 4A. Then, the bail arm 3 is extended between an arm member 6 pivotably supported to the one arm portion 4A and the other arm portion 4A, so that this bail arm 3 together with the arm member 6 is pivotably switched over between a line-takeup position A and an open position B.

Further, in this reel, the one arm portion 4A accommodates therein a toggle mechanism T for setting and retaining the bail arm 3 either to one of the two positions of the line-takeup position A and the open position B and a return mechanism R for forcibly returning the bail arm 3 to the line-takeup position A if the rotor 4 is rotated in a line-takeup direction when the bail arm 3 is set at the open position B.

Incidentally, on the side of this arm portion 4A, there are provided a guide roller 8 for guiding a fishing line and a lever 9 for pivoting the arm member 6 by pressing its cam face 6A so as to quickly set the bail arm 3 to the open position.

In a bait casting operation, a fishing rod is swung strongly. Therefore, if the handle 1 is currently at such a position subject to a pivotal force for urging this handle in a line-takeup direction, a strong pivotal force from the handle 1 may erroneously rotate the rotor 4. Then, in this reel, there is provided a returning force adjustment mechanism C for restricting the erroneous movement of the bail arm 3 to its line-takeup position A by the return mechanism R due to such strong pivotal force.

The toggle mechanism T includes a projecting member 15 urged by a compression spring 14 in a direction projecting relative to a pivot member 13 pivotable about a support shaft 12 extending in parallel with a pivot support shaft 11 of the arm member 6; and the projecting member 15 is engaged with the arm member 6. Then, in operation of this toggle mechanism T, the pivotal motion is stopped at a position where a leading end 15A of the projecting member 15 comes adjacent to either of the partition walls 4B, 4B inside the arm portion, thus determining the position of the bail arm 3 either at the line-takeup position A or the open position B.

Figure 1:
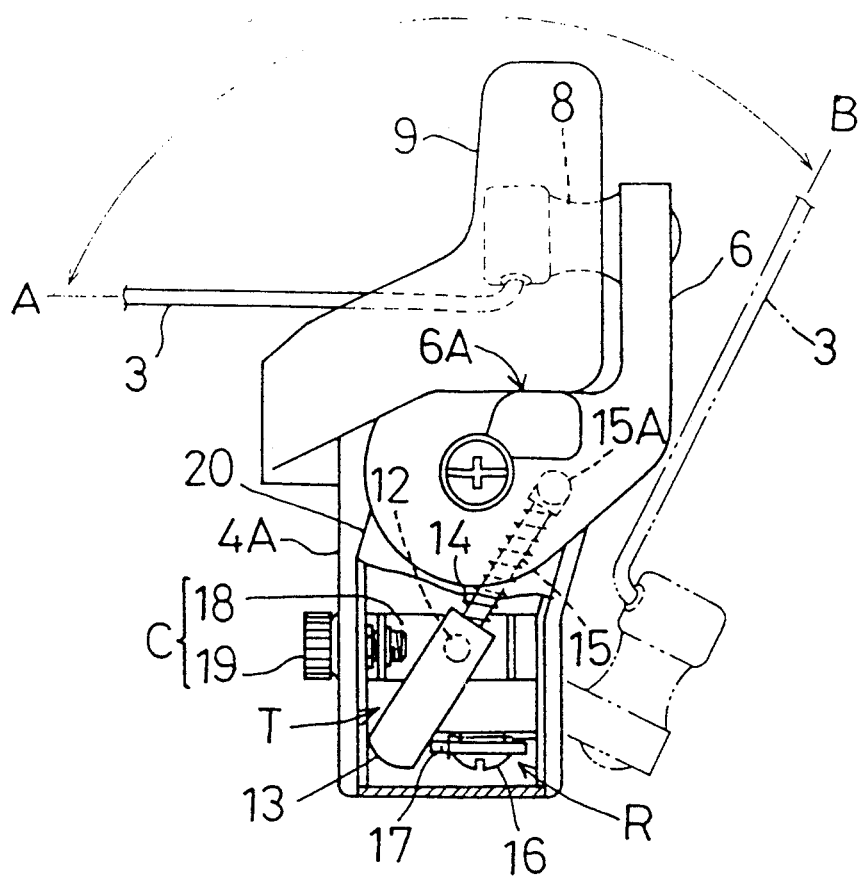
FIG. 1 is a partially cutaway front view showing an opening construction for a bail arm.
Figure 2:
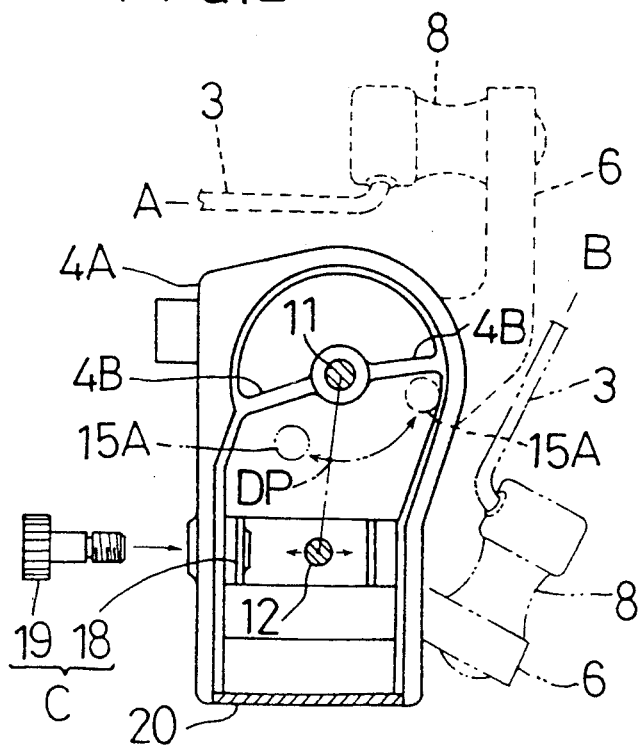
FIG. 2 is an exploded view showing a returning force adjustment mechanism.
Figure 3:
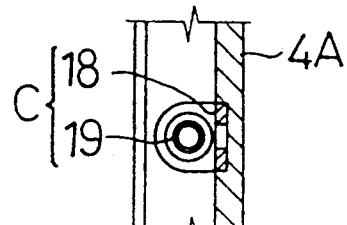
FIG. 3 is a section view of the returning force adjustment mechanism.
Figure 4:
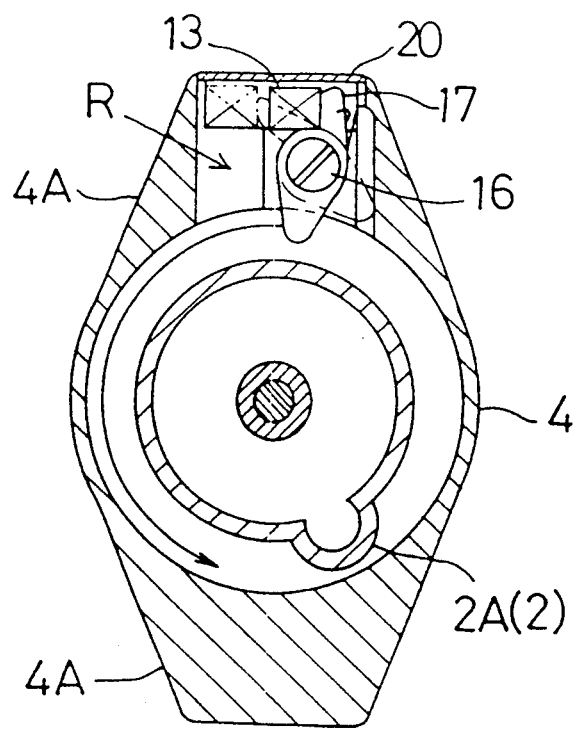
FIG. 4 is a section view showing a return mechanism.

On the other hand, the return mechanism R, as shown in FIG. 4, includes a projecting portion 2A formed on the reel body and a pivot element 17 pivotably supported to the arm portion 4A through a shaft member 16 so that the pivot element 17 comes into contact with the pivot member 13 to pivot this pivot member 13 towards the line-takeup position A when the rotor 4 is rotated in the line-takeup direction.

The returning force adjustment mechanism C includes a slide plate 18 supporting a support shaft 12 of the pivot member 13 and a screw-like fixing member 19 for sliding the slide plate 18. Then, when this slide plate 18 is slided, there occurs a variation in a reaction force due to change in a compression amount of the compression spring when the arm member 6 reaches the dead point DP and due also to change in a force component of the urging force resisting the pivotal motion towards the line-takeup position A, whereby an operational force required for switching the bail arm 3 to the line-takeup position A can be adjusted (incidentally, with this adjustment, the position of the dead point DP also changes).

The above-described construction is protected by means of a lid member 20.

Figure 6:
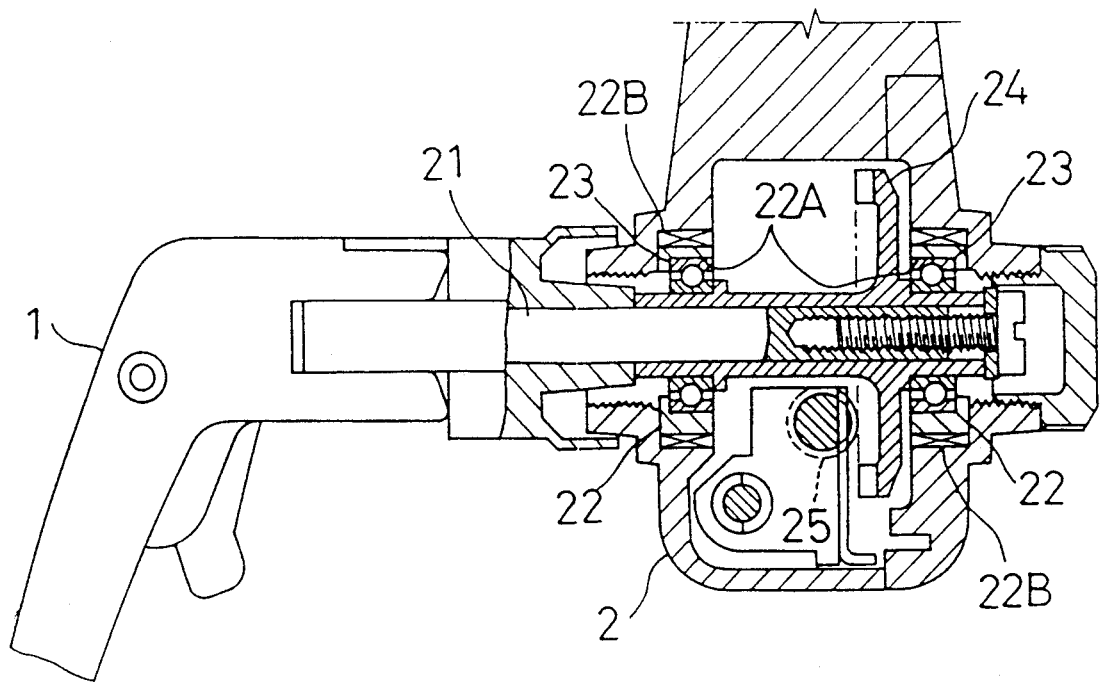
FIG. 6 is a vertical section of the reel.

Further, in this reel, a drive unit extending from the handle 1 is constructed as shown in FIG. 6.

That is, a handle shaft 21 connected with the handle 1 is fitted into a drive gear 24 which is supported to the reel body 2 via a bush 22 and a bearing 23, so that torque can be transmitted from the handle shaft 21 to the drive gear 24. The force from this drive gear 24 is transmitted via a pinion gear 25 to the rotor 4. This pinion gear 25, through not shown, is loosely fitted on the spool shaft.

Figure 7:
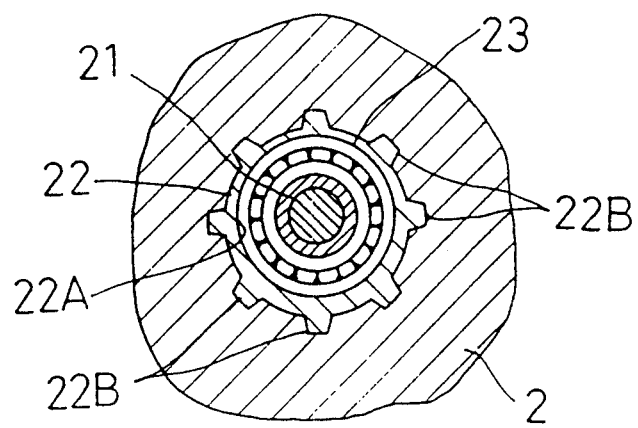
FIG. 7 is a section view showing a bush.

As shown in FIG. 7, the bush 22 has a bearing retaining face 22A at a position eccentric relative to the axis of the bush 22. Further, engaging elements 22B are formed on an outer periphery of the bush 22. Then, through selection of engaging positions of these engaging elements 22B relative to reel body 2, the axial position of the handle shaft 21 can be varied in accordance with a design of the reel, for example.

In place of the above-described embodiment, the present invention can be variously embodied as specifically described next.

Figure 8:
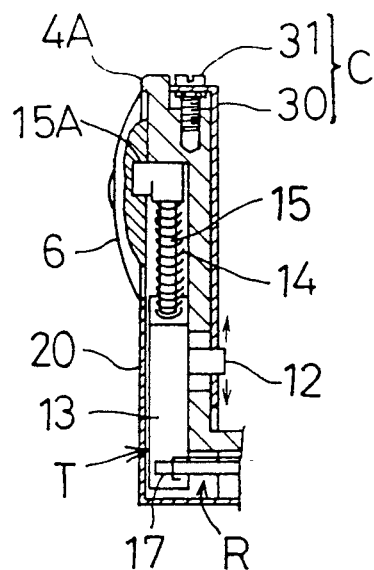
FIG. 8 shows another embodiment in which a position of a support shaft is adjusted, FIGS. 9 and 10 respectively show further embodiments in which a returning stroke to a line-takeup position is adjusted.

(i) In an alternate construction of FIG. 8, the returning force adjustment mechanism C includes a plate 30 engageable with the support shaft 12 and a screw-like fixing member 31 for fixedly positioning this plate 30, so that the pivot shaft 12 of the pivot member 13 is displaced longitudinally (i.e. the forward/rearward direction) of the arm portion 4A of the rotor 4.

Figure 9:
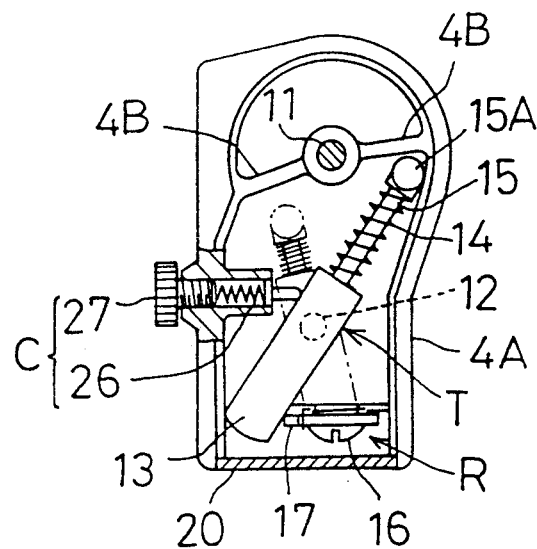

(ii) In a further construction of the returning force adjustment mechanism shown in FIG. 9, the arm portion 4A accommodates therein a compression spring 26 for applying an urging force to the bail arm 3 towards its line-takeup position A; and a screw-like fixing member 27 is provided for adjusting the urging force of this compression spring 26.

Figure 10:
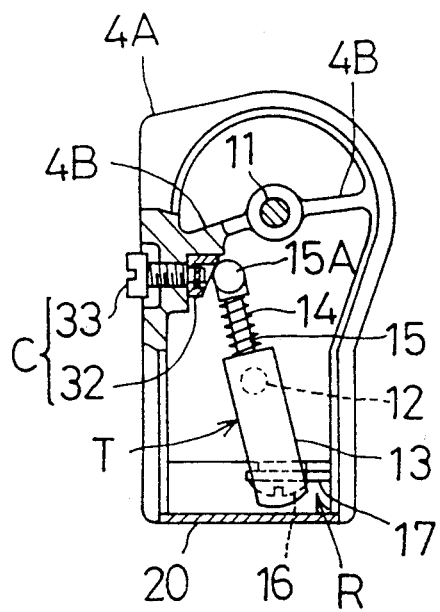

(iii) In a further construction shown in FIG. 10, the returning force adjustment mechanism C includes a regulating member 32 which comes into contact with the leading end 15A of the projecting member 15 so as to shift closer to the dead point DP an end of the pivot stroke when the bail arm 3 is set to the open position B. And, the mechanism C further includes a screw-like fixing member 33 for adjusting the position of this regulating member 32.

Figure 11:
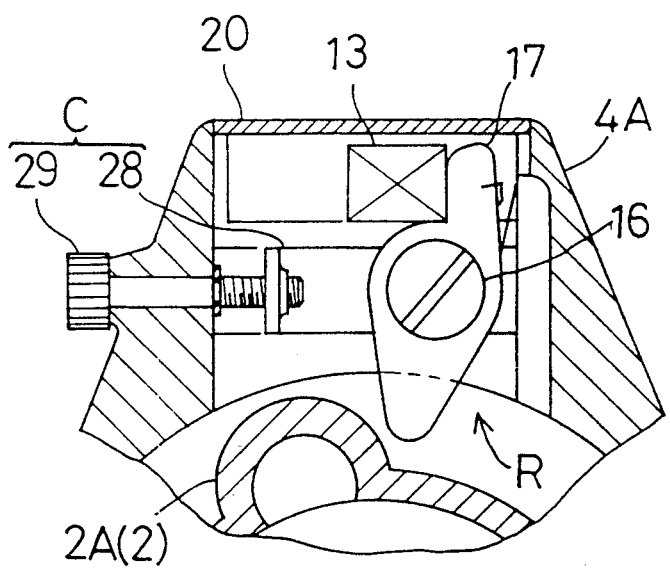
FIG. 11 shows a still further embodiment in which a returning force resulting from a return mechanism is adjusted.

(iv) In a still further construction shown in FIG. 11, the returning force adjustment mechanism C includes a slide plate 28 having a shaft member 16 for supporting the pivot element 17 and a screw-like fixing member 29 for adjusting the position of this slide plate 28, thus effecting an arm length adjustment needed for the pivot element 17 to pivot the pivot member 13.

Incidentally, in the drawings of the above-described alternate embodiments, the components having substantially the same functions as those employed in the foregoing embodiment are denoted with the same reference marks and numerals.

In addition to the above, the present invention can be also embodied in other manners with a further construction adapted for adjusting the spring force of the toggle mechanism or a still further construction adapted for switching over the spring force between a strong force and a weak force.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spinning reel comprising:
   a reel body;
   a rotor rotatably supported to the reel body;
   a bail arm extending between a pair of arm portions of the rotor and pivotably switchable between an open position and a line-takeup position;
   a toggle mechanism disposed inside the arm portions for retaining the bail arm either to the open position or to the line-takeup position;
   a return mechanism for returning the bail arm from the open position to the line-takeup position when the rotor is rotated in a line-takeup direction; and
   a returning force adjustment mechanism for variably setting at a desired value a reaction force needed for returning the bail arm from the open position to the line-takeup position; and
   wherein said toggle mechanism includes:
      a pivot member pivotable about a support shaft extending in parallel with a pivot support shaft of an arm member pivotably supported to one of said arm portions; and
      a projecting member urged by a compression spring in a direction projecting relative to said pivot member, said projecting member being engaged with said arm member; and
   wherein said return mechanism includes:
      a projecting portion formed on said reel body; and
      a pivot element pivotably supported to said arm portion through a shaft member so that said pivot element comes into contact with said pivot member to pivot said pivot member towards said line-takeup position when said rotor is rotated in the line-takeup direction; and
   wherein said returning force adjustment mechanism includes:
      a slide plate supporting the support shaft of said pivot member; and
      a fixing member for sliding said slide plate.

2. A spinning reel comprising:
   a reel body;
   a rotor rotatably supported to the reel body;
   a bail arm extending between a pair of arm portions of the rotor and pivotably switchable between an open position and a line-takeup position;
   a toggle mechanism disposed inside the arm portions for retaining the bail arm either to the open position or to the line-takeup position;
   a return mechanism for returning the bail arm from the open position to the line-takeup position when the rotor is rotated in a line-takeup direction; and
   a returning force adjustment mechanism for variably setting at a desired value a reaction force needed for returning the bail arm from the open position to the line-takeup position; and
   wherein said toggle mechanism includes:
      a pivot member pivotable about a support shaft extending in parallel with a pivot support shaft of an arm member pivotably supported to one of said arm portions; and
      a projecting member urged by a compression spring in a direction projecting relative to said pivot member, said projecting member being engaged with said arm member; and
   wherein said return mechanism includes:
      a projecting portion formed on said reel body; and
      a pivot element pivotably supported to said arm portion through a shaft member so that said pivot element comes into contact with said pivot member to pivot said pivot member towards said line-takeup position when said rotor is rotated in the line-takeup direction; and
   wherein said returning force adjustment mechanism includes:
      a slide plate having the shaft member for supporting said pivot element; and
      a fixing member for adjusting the position of said slide plate.

3. A spinning reel comprising:
   a reel body;
   a rotor rotatably supported to said reel body, said rotor including:
      a support arm;
      a bail arm supported on said support arm, said bail arm being pivotable between a line winding position and a line unwinding position; and
      toggle means including:
         a support shaft supported to said support arm;
         a toggle body pivotable about said support shaft, said toggle body having an end, said end of said toggle body being connected to said bail arm, said toggle body being pivoted to a first position to urge said bail arm to said line winding position when said bail arm is in said winding position, and said toggle body being pivoted to a second position to urge said bail arm to said line unwinding position when said bail arm is in said unwinding position; and
         a displacing means for displacing said support shaft to adjust an urging direction of said toggle body against said bail arm; and
      a return mechanism provided between said reel body and said rotor, said return mechanism causing said toggle body to pivot to switch said bail arm from said line unwinding position to said line winding position in association with rotation of said rotor in a line winding direction.

4. A spinning reel as defined by claim 3, wherein said displacing means includes a support plate, said support plate being supported by said support arm, said support plate being displaceable with respect to said support arm, and wherein said support shaft is mounted on said support plate.

5. A spinning reel as defined by claim 4, wherein said displacing means further comprises a fixing member for displacing said support plate, said fixing member being supported by said support arm.

6. A spinning reel as defined by claim 5, wherein the position of said support plate is fixable by said fixing member.

7. A spinning reel as defined by claim 6, wherein said support plate is slidable in a direction that is substantially normal to said support shaft of said toggle means.

* * * * *